United States Patent
Kato et al.

(10) Patent No.: US 7,910,238 B2
(45) Date of Patent: Mar. 22, 2011

(54) ALKALINE BATTERY

(75) Inventors: Susumu Kato, Osaka (JP); Seiji Wada, Osaka (JP); Yasushi Sumihiro, Hyogo (JP)

(73) Assignee: Panasonic Corporation, Osaka (JP)

( * ) Notice: Subject to any disclaimer, the term of this patent is extended or adjusted under 35 U.S.C. 154(b) by 85 days.

(21) Appl. No.: 12/067,904

(22) PCT Filed: Apr. 17, 2007

(86) PCT No.: PCT/JP2007/058338
§ 371 (c)(1),
(2), (4) Date: Mar. 24, 2008

(87) PCT Pub. No.: WO2007/123119
PCT Pub. Date: Nov. 1, 2007

(65) Prior Publication Data
US 2009/0269663 A1    Oct. 29, 2009

(30) Foreign Application Priority Data

Apr. 19, 2006  (JP) ................. 2006-115762

(51) Int. Cl.
*H01M 6/00* (2006.01)
*H01M 8/00* (2006.01)
*H01M 10/00* (2006.01)

(52) U.S. Cl. ........................................ 429/48

(58) Field of Classification Search .......... 429/171, 429/174, 185
See application file for complete search history.

(56) References Cited

U.S. PATENT DOCUMENTS

| | | | |
|---|---|---|---|
| 6,042,967 A | 3/2000 | Sargeant et al. | |
| 6,413,666 B1* | 7/2002 | Oya | 429/53 |
| 2002/0041988 A1 | 4/2002 | Payne et al. | |
| 2002/0068220 A1* | 6/2002 | Wyler et al. | 429/231 |

(Continued)

FOREIGN PATENT DOCUMENTS

CN    1048633    1/1991

(Continued)

OTHER PUBLICATIONS

BASF Corporation, Effects of Moisture Conditioning Methods on Mechanical Properties of Injection Molded Nylon 6 (2003).*

(Continued)

*Primary Examiner* — Jennifer K. Michener
*Assistant Examiner* — Eli S Mekhlin
(74) *Attorney, Agent, or Firm* — McDermott Will & Emery LLP

(57) ABSTRACT

An alkaline battery of the present invention includes a battery case, a power generating element housed in the interior of the battery case, and an assembled sealing part for closing the opening of the battery case. The assembled sealing part includes a resin sealing member. The sealing member includes a central cylindrical portion having a through-hole for inserting a shank of a negative electrode current collector therethrough, a peripheral cylindrical portion interposed between the periphery of the negative electrode terminal plate and the end portion of the opening of the battery case, and a joint portion for joining the central cylindrical portion and the peripheral cylindrical portion. The end portion of the opening of the battery case is curved such that the top of the peripheral cylindrical portion of the sealing member is wrapped therein, and the curved portion is crimped inward so that the periphery of the negative electrode terminal plate is fixed tightly. The sealing member includes polyamide having an equilibrium moisture content at a relative humidity of 50% of 0.9 to 1.7%.

6 Claims, 3 Drawing Sheets

U.S. PATENT DOCUMENTS

2006/0083985 A1 * 4/2006 Dunham .................. 429/185

FOREIGN PATENT DOCUMENTS

| EP | 0 107 267 A1 | | 5/1984 |
|---|---|---|---|
| JP | 56-32669 | | 4/1981 |
| JP | 57-72266 | | 5/1982 |
| JP | 60-56360 | | 4/1985 |
| JP | 60-77352 | | 5/1985 |
| JP | 60077352 A | * | 5/1985 |
| JP | 4-87149 | | 3/1992 |
| JP | 11-135087 | | 5/1999 |
| JP | 2001-43836 | | 2/2001 |
| JP | 2004119328 A | * | 4/2004 |

OTHER PUBLICATIONS

Hull et al. "Why Alkaline Cells Leak", Electrochemical Society Active Member, vol. 124, (1977), p. 332-339.

European Search Report issued in European Patent Application No. 07741774.9-1227, mailed Mar. 3, 2010.

* cited by examiner

ALKALINE BATTERY

Related Applications

This application is the U.S. National Phase under 35 U.S.C. §371 of International Application No. PCT/JP2007/058338, filed on Apr. 17, 2007, which in turn claims the benefit of Japanese Application No. 2006-115762, filed on Apr. 19, 2006, the disclosures of which Applications are incorporated by reference herein.

TECHNICAL FIELD

The present invention relates to alkaline batteries, and specifically to a sealing member in an assembled sealing part for closing an opening of a battery case.

BACKGROUND ART

In general, alkaline batteries have a structure in which an opening of a battery case is sealed using a resin sealing member and a negative electrode terminal plate. Specifically, they have a structure in which a sealing member is interposed between a battery case and a negative electrode terminal plate, and the end portion of the opening of the battery case is curved inward, and then crimped toward the periphery of the terminal plate with the sealing member interposed therebetween, so that the terminal plate is fixed tightly. Various studies have been carried out with respect to the sealing member used in a sealing portion of alkaline batteries.

For example, Patent Document 1 proposes that in coin type batteries, the moisture rate in a sealing member made of 6,6-nylon be adjusted to as low as 0.5 to 2.0%, thereby to enhance the mechanical strength of the sealing member and improve the leakage resistance. Moreover, Patent Document 2 proposes that in coin type batteries, for a sealing member, 6,12-nylon whose water absorption rate is low, dimensional change is small, and tensile strength is high be used, thereby to improve leakage resistance.

Among alkaline batteries, there is a battery having the following structure. The battery includes a battery case also serving as a positive electrode terminal for housing a power generating element in the interior thereof, and an assembled sealing part for closing an opening of the battery case. The assembled sealing part comprises: a negative electrode terminal plate; a negative electrode current collector having a head for providing an electrical connection with the negative electrode terminal plate, and a shank; and a resin sealing member. The sealing member comprises a central cylindrical portion having a through-hole for inserting the shank of the negative electrode current collector therethrough, a peripheral cylindrical portion interposed between the periphery of the negative electrode terminal plate and the end portion of the opening of the battery case, and a joint portion for joining the central cylindrical portion and the peripheral cylindrical portion. The end portion of the opening of the battery case is curved such that the top of the peripheral cylindrical portion of the sealing member is wrapped therein, and the curved portion is crimped inward, so that the periphery of the negative electrode terminal plate is fixed tightly.

However, in the alkaline batteries having the aforementioned structure, even in the case where the techniques as proposed in Patent Documents 1 and 2 are applied, if the batteries are stored in a high humid environment, the moisture rate in the sealing member is increased, and a creeping phenomenon easily occurs between the negative electrode current collector and the sealing member, making it difficult to surely prevent the leakage. The creeping phenomenon occurs when the reactions as expressed in the formula (1) and the formula (2) below are facilitated between the negative electrode current collector and the sealing member as a result of the increase in the moisture rate in the sealing member.

$$O_2 + H_2O + e^- \rightarrow 4OH^- \tag{1}$$

$$2H_2O + 2e^- \rightarrow 2OH^- + H_2 \tag{2}$$

In particular, in the case where nickel oxyhydroxide is used for the positive electrode active material in order to improve the heavy load discharge characteristics as in the case of Patent Document 3, the positive electrode potential is high, and thus the amount of oxygen gas generated by the electrolysis of water is increased. When oxygen is present as in the case of Non-Patent Document 1, the reaction as expressed by the formula (1) proceeds on the surface of the negative electrode current collector, and thus the creeping as mentioned above is facilitated. For the reasons above, in the case of using nickel oxyhydroxide for the positive electrode active material, compared with the case of using manganese dioxide, disadvantageously, the leakage resistance is easily reduced.

Patent Document 1: Japanese Laid-Open Patent Publication No. Sho 60-56360
Patent Document 2: Japanese Laid-Open Patent Publication No. Sho 60-77352
Patent Document 3: Japanese Laid-Open Patent Publication No. Sho 57-72266
Non-Patent Document 1: J. Electrochem. Soc., Vol. 124, (1977), P332

DISCLOSURE OF THE INVENTION

Problem To be Solved by the Invention

In view of the above, the present invention, in order to solve the foregoing known problem, intends to provide a highly reliable alkaline battery capable of suppressing the occurrence of a creeping phenomenon between the negative electrode current collector and the sealing member even when the battery is stored in a high humid environment.

Means for Solving the Problem

The present invention is directed to an alkaline battery comprising a battery case, a power generating element housed in an interior of the battery case, and an assembled sealing part for closing an opening of the battery case. The assembled sealing part includes a negative electrode terminal plate, a negative electrode current collector having a head for providing an electrical connection with the negative electrode terminal plate and a shank, and a resin sealing member. The sealing member includes a central cylindrical portion having a through-hole for inserting the shank of the negative electrode current collector therethrough, a peripheral cylindrical portion interposed between a periphery of the negative electrode terminal plate and an end portion of the opening of the battery case, and a joint portion for joining the central cylindrical portion and the peripheral cylindrical portion. The end portion of the opening of the battery case is curved such that an upper portion of the peripheral cylindrical portion of the sealing member is wrapped therein, and the curved portion of the battery case is crimped inward such that the periphery of the negative electrode terminal plate is fixed tightly. And the sealing member includes polyamide having an equilibrium moisture content at a relative humidity of 50% of 0.9 to 1.7%.

It is preferable that the polyamide includes 6,10-nylon or 6,12-nylon.

It is preferable that the power generating element comprises a positive electrode, a negative electrode, and a separator disposed between the positive electrode and the negative electrode, the positive electrode including a nickel oxyhydroxide.

It is preferable that in the assembled sealing part before assembling, a diameter A of the shank of the negative electrode current collector, and a diameter B of the through-hole and an outer diameter C of the central cylindrical portion at a relative humidity of 50% satisfy A/B=1.02 to 1.12 and C/A=1.8 to 3.2.

It is preferable that between the shank of the negative electrode current collector and the through-hole of the central cylindrical portion, asphalt, polybutene or polyaminoamide is applied as a sealant.

EFFECT OF THE INVENTION

According to the present invention, there can be provided a highly reliable alkaline battery capable of suppressing the occurrence of a creeping phenomenon between the negative electrode current collector and the sealing member even when the battery is stored in a high humid environment can be provided.

BEST MODE FOR CARRYING OUT THE INVENTION

One embodiment of the present invention is described below with reference to FIGS. 1 and 2.

Figure 1:
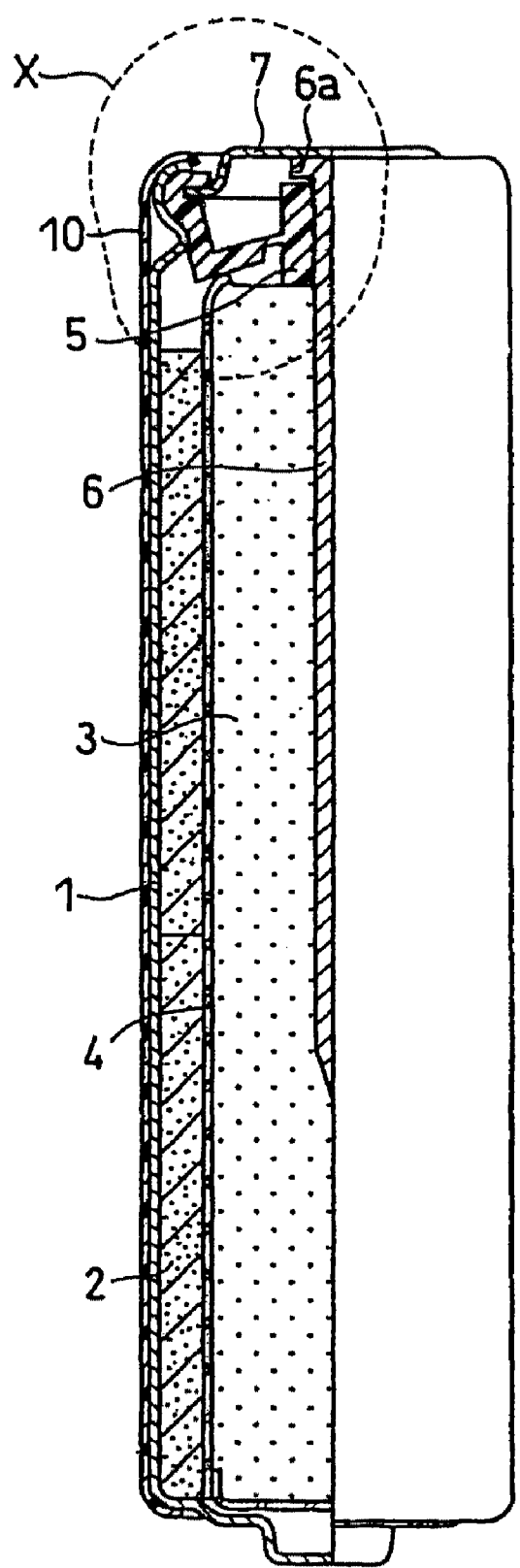
FIG. 1 A partially cross-sectional front view of an alkaline battery in one embodiment of the present invention.

FIG. 1 is a partially cross-sectional front view of an alkaline dry battery as one embodiment of the present invention.

In the battery case 1 of a bottomed cylindrical shape serving as a positive electrode terminal, pellets of positive electrode material mixture 2 of a hollow cylindrical shape are in contact with the side wall of the battery case. In the hollow formed by the pellets of positive electrode material mixture 2, a gelled negative electrode 3 is disposed with a separator 4 interposed therebetween. The pellets of positive electrode material mixture 2, the separator 4 and the gelled negative electrode 3 are impregnated with an alkaline electrolyte. For the separator 4, for example, a non-woven fabric mainly composed of polyvinyl alcohol fibers and rayon fibers may be used.

For the positive electrode material mixture 2, for example, a mixture of at least one selected from a manganese dioxide powder and a nickel oxyhydroxide powder serving as a positive electrode active material, a graphite powder serving as a conductive material, and an aqueous potassium hydroxide solution serving as an alkaline electrolyte may be used.

For the gelled negative electrode 3, for example, a mixture of a zinc powder serving a negative electrode active material, sodium polyacrylate serving as a gelling agent, and an aqueous potassium hydroxide solution serving as an alkaline electrolyte may be used.

Figure 2:
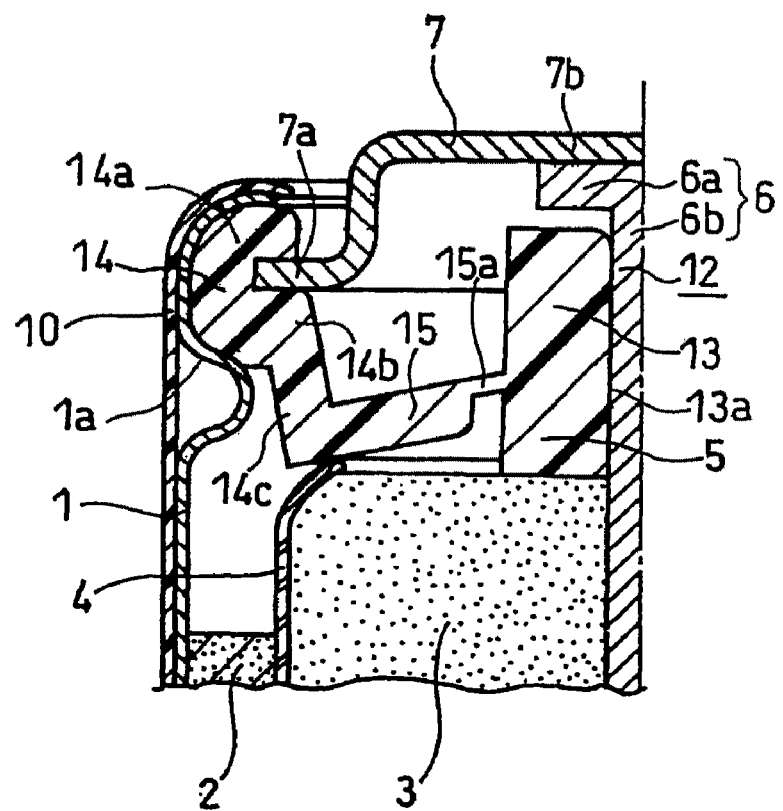
FIG. 2 A magnified longitudinal sectional view of a sealing portion (a portion X) in FIG. 1.

FIG. 2 is a magnified longitudinal sectional view of the portion X (a sealing portion of an alkaline dry battery) in FIG. 1.

After the power generating element composed of the pellets of positive electrode material mixture 2, the gelled negative electrode 3 and the separator 4 is housed in the battery case 1, a step 1a is formed in the vicinity of the opening of the battery case 1, and the opening of the battery case 1 is then closed with an assembled sealing part 12. On the step 1a, a below-mentioned horizontal portion 14b is disposed. The assembled sealing part 12 is composed of a negative electrode terminal plate 7 having a rim portion 7a in the periphery and a flat portion 7b in the central portion, a negative electrode current collector 6 having a head 6a electrically connected with the flat portion 7b of the negative electrode terminal plate 7, and a resin sealing member 5. In the center of the gelled negative electrode 3, a shank 6b of the negative electrode current collector 6 is inserted.

Figure 3:
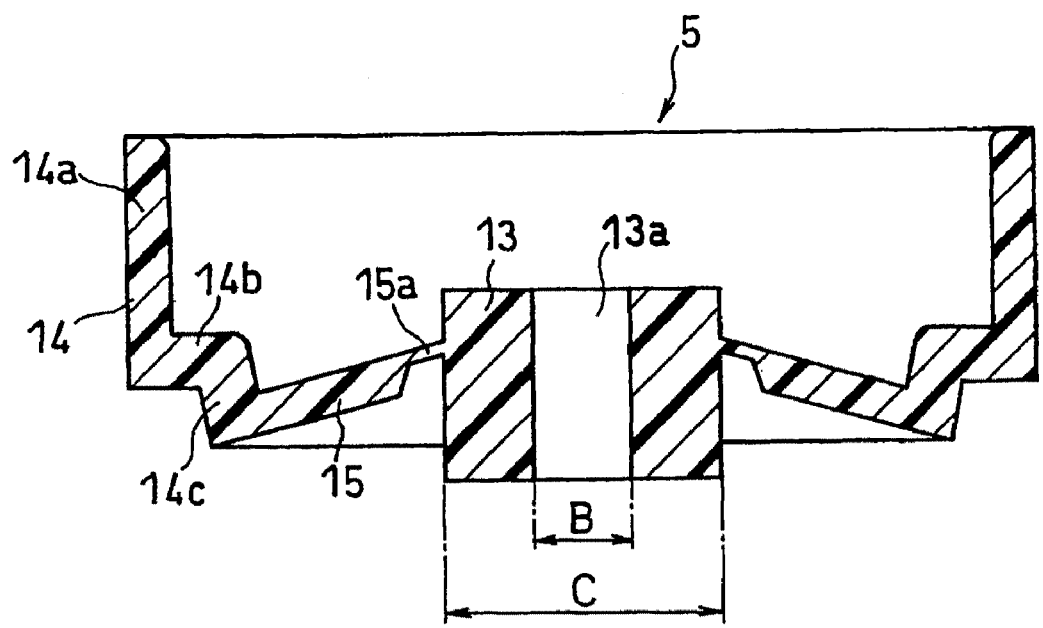
FIG. 3 A longitudinal sectional view of a sealing member used in the alkaline battery in FIG. 1.

As shown in FIG. 3, the sealing member 5 is composed of: a central cylindrical portion 13 having a through-hole 13a for inserting the shank 6b of the negative electrode current collector 6 therethrough; a peripheral cylindrical portion 14 interposed between the periphery of the negative electrode terminal plate 7 and the end portion of the opening of the battery case 1; and a joint portion 15 for joining the central cylindrical portion 13 and the peripheral cylindrical portion 14, and has a ring-shaped thin portion 15a that acts as a safety valve. The peripheral cylindrical portion 14 is compose of a ring-shaped flat portion 14b for supporting the periphery of the negative electrode terminal plate 7, an upper cylindrical portion 14a extending upward from the outer periphery of the flat portion 14b, and a lower cylindrical portion 14c extending downward from the inner periphery of the flat portion 14b. The end portion of the opening of the battery case 1 is curved such that the upper end of the upper cylindrical portion 14a of the sealing member 5 is wrapped therein, and the curved portion is crimped inward such that the periphery of the negative electrode terminal plate 7 is fixed tightly onto the flat portion 14b. The outer surface of the battery case 1 is covered with an outer label 10.

The negative electrode terminal plate 7, for example, has a hole (not shown) for discharging gas from the inside of the battery to the outside of the battery in the interface between the rim portion 7a and the flat portion 7b. If the internal pressure of the battery is abnormally increased, the thin portion 15a of the sealing member 5 fractures. The foregoing hole makes it possible to discharge gas to the outside of the battery.

The sealing member 5 is made of polyamide having an equilibrium moisture content at a relative humidity of 50% of 0.9 to 1.7%. For this reason, even when the battery is stored in a high humidity environment, the leakage due to a creeping phenomenon that occurs between the shank 6b of the negative electrode current collector 6 and the through-hole 13a of the central cylindrical portion 13 can be surely prevented. In particular, even in the case of using a nickel oxyhydroxide, with which the foregoing creeping phenomenon easily occurs, as a positive electrode active material, it is possible to surely suppress the occurrence of the creeping phenomenon, and ensure excellent heavy load discharge characteristics which can be obtained with the use of a nickel oxyhydroxide as well as excellent leakage resistance. The equilibrium moisture content of the sealing member 5 at a relative humidity of 50% of less than 0.9% reduces the toughness of the sealing member, and thus, when the shank 6b of the negative electrode current collector 6 is inserted under pressure into the through-hole 13a in the sealing member 5, or when the battery is sealed by crimping, the sealing member 5 is easily broken to cause leakage. The equilibrium moisture content of the sealing member 5 at a relative humidity of 50% of more than 1.7% causes the moisture to be easily supplied between the negative electrode current collector 6 and the sealing member 5, and thus, it becomes difficult to surely prevent the creeping phenomenon that occurs between the negative electrode current collector 5 and the sealing member 5. Further, in order to improve the leakage resistance in a high humid environment to a great extent, it is preferable that the equilibrium moisture content of the sealing member 5 at a relative humidity of 50% is 0.9 to 1.3%.

An equilibrium moisture content at a relative humidity of 50% as used herein refers to an amount of moisture contained in a sample that has been allowed to stand for a predetermined period of time in an environment with a temperature of 45° C. and a relative humidity of 50% until an equilibrium state is reached.

Such an equilibrium moisture content R (%) of the sealing member 5 at a relative humidity of 50% can be determined, for example, by measuring a weight W1 of a sealing member after allowed to stand for 48 hours in an environment with a temperature of 45° C. and a relative humidity of 50%, and a weight W2 of a sealing member (in a completely dried state) after allowed to stand for 24 hours in a dry environment under vacuum with a temperature of 45° C., and calculating using the relational equation:

$$R (\%) = (W1 - W2)/W2 \times 100.$$

The foregoing equilibrium moisture content can be adjusted by controlling, for example, at least one of the conditions for heating the sealing member 5 such as the heat treatment duration and temperature, thereby to adjust the water absorption ability of the polyamide forming the sealing member 5. Since polyamide is a compound partially having a crystalline structure, its crystallinity is increased by heat treatment, which makes it possible to degrade the water absorption property of the sealing member 5 made of polyamide.

For the polyamide, for example, 6,10-nylon, 6,12-nylon, or 11-nylon is used. Preferred among these as the polyamide is 6,10-nylon or 6,12-nylon. Because of comparatively high melting points of 6,10-nylon (melting point: approximately 215° C.) and 6,12-nylon (melting point: approximately 215° C.) as compared with 11-nylon (melting point: approximately 185° C.) and 12-nylon (melting point: approximately 175° C.), sealing members made of these are excellent in heat resistance and have improved safety.

Further, the material of the negative electrode current collector 6 is exemplified by, for example, cupper, tin, brass, tin or indium plated cupper, indium plated tin, and tin or indium plated brass. In view of an excellent conductivity and an excellent corrosion resistance to electrolyte, it is preferable to use tin plated brass.

Figure 4:
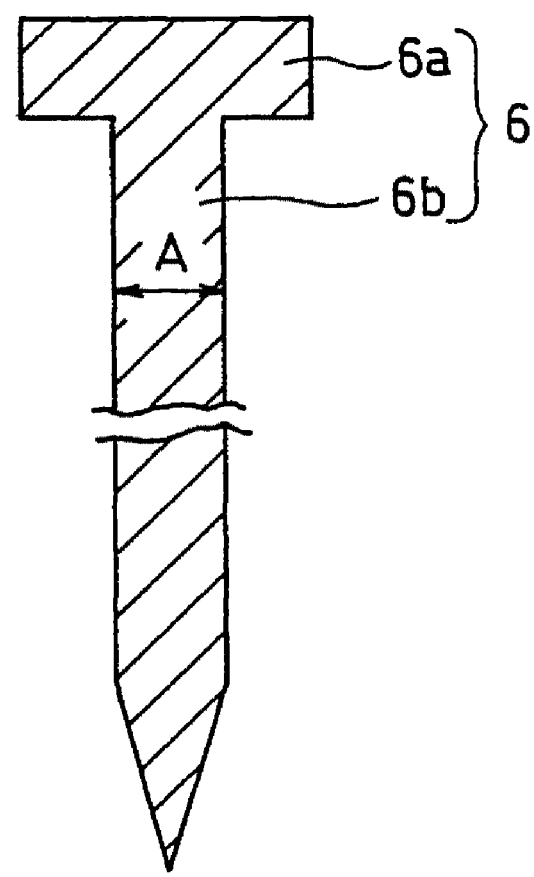
FIG. 4 A longitudinal sectional view of a negative electrode current collector used in the alkaline battery in FIG. 1.

FIGS. 3 and 4 show longitudinal sectional views of the sealing member 5 and the negative electrode current collector 6 before assembled into the assembled sealing part 12. It is preferable that in the assembled sealing part 12 before assembling, a diameter A of the shank 6b of the negative electrode current collector 6, and a diameter B of the through-hole 13a and an outer diameter C of the central cylindrical portion 13 of the sealing member 5 at a relative humidity of 50% satisfy A/B=1.02 to 1.12 and C/A=1.8 to 3.2.

The dimensions of the diameter B of the through-hole 13a and the outer diameter C of the central cylindrical portion 13 of the sealing member 5 at a relative humidity of 50% can be obtained by measuring under the condition, for example, that the sealing member 5 is allowed to stand for a predetermined period of time in an environment with a temperature of 45° C. and a relative humidity of 50% until an equilibrium state is reached.

When the A/B is 1.02 or more, a good fit between the shank 6b of the negative electrode current collector 6 and the through-hole 13a of the sealing member 5 can be obtained, and thus the creeping phenomenon that occurs between the negative electrode current collector 6 and the sealing member 5 is suppressed. When the A/B is 1.12 or less, the stress to be applied to the joint portion 15 (in particular to the thin portion 15a) of the sealing member 5 at the time of sealing the battery is reduced, and thus the occurrence of crack in the joint portion 15 is suppressed.

When the C/A is 1.8 or more, the stress to be applied to the joint portion 15 (in particular to the thin portion 15a) of the sealing member 5 at the time of sealing the battery is reduced, and thus the occurrence of crack in the joint portion 15 is suppressed. When the C/A is 3.2 or less, a good fit between the shank 6b of the negative electrode current collector 6 and the through-hole 13a of the sealing member 5 can be obtained, and thus the creeping phenomenon that occurs between the negative electrode current collector 6 and the sealing member 5 is suppressed.

In order to obtain an excellent sealing property and to further suppress the creeping phenomenon between the negative electrode current collector 6 and the sealing member 5, it is preferable that a sealant such as asphalt, polybutene, polyaminoamide or fluorine oil is applied between the shank 6b of the negative electrode current collector 6 and the through-hole 13b of the central cylindrical portion 13. The applying amount of the sealant may be, for example, 0.5 to 3.0 mg/cm².

For the asphalt, for example, blown asphalt having a softening point of 90 to 120° is used. The softening point can be measured, for example, based on the ring and ball method (JIS K 7234).

For the polybutene, for example, the one having a viscosity of 300 to 1200 Pa·s or the one having a molecular weight of 2000 to 5000 is used.

For the polyaminoamide, for example, the one having a viscosity of 1000 to 4000 Pa·s or the one having an amine value of 100 to 300 is used. The amine value, which shows a total amount of the 1st to 3rd class amines, represents mg number of potassium hydroxide equivalent to an amount of hydrochloric acid required to neutralize 1 g of a sample. The viscosity can be measured, for example, using VT-04F Viscotester available from RION Co., Ltd. The molecular weight can be determined, for example, by a vapor pressure osmometry. The amine value can be measured, for example, based on ASTM D 2074.

For the fluorine oil, for example, the one having a kinematic viscosity of 50 to 500 cSt is used. The kinematic viscosity can be measured, for example, based on ASTM D 445. For example, perfluoro polyethyl ether is used.

It is preferable that a sealing member made of 6,12-nylon is used in combination with blown asphalt serving as a sealant because this makes it possible to obtain remarkably excellent leakage resistance and sealing property in a high humid environment.

For the purpose of preventing deterioration, an antioxidant such as 2,6-di-t-butyl cresol may be added to the sealing member made of polyamide. In addition, for the purpose of increasing the mechanical strength, an additive such as carbon black, a fiber glass or talc may be added to the polyamide. The addition of the foregoing various additives to the sealing member is carried out, for example, by adding the additive to a raw material such as diamine, dicarboxylic acid or caprolactam in the process of synthesizing a polyamide by polymerization.

EXAMPLES

Although examples of the present invention are described below in detail, the present invention is not limited to these Examples.

Example 1

(1) Fabrication of Positive Electrode Material Mixture

A nickel oxyhydroxide powder (mean particle size: 12 µm), a manganese dioxide powder (mean particle size: 40 µm), and a graphite powder (mean particle size: 15 µm) were mixed in a weight ratio of 50:50:10. This mixture was mixed with a 40 wt % potassium hydroxide aqueous solution serving as an alkaline electrolyte in a weight ratio of 100:1, sufficiently stirred, and then compression molded into flakes. Thereafter, the flakes of positive electrode material mixture were crushed into granules, which were then classified into 10 to 100 mesh with a sieve. The resultant granules were molded under pressure into hollow cylinders to obtain pellets of positive electrode material mixture.

(2) Fabrication of Gelled Negative Electrode

A gelled negative electrode was prepared by mixing sodium polyacrylate serving as a gelling agent, a 40 wt % potassium hydroxide aqueous solution serving as an alkaline electrolyte, and a zinc powder (mean particle size: 150 µm) serving as a negative electrode active material in a weight ratio of 1:33:66.

(3) Fabrication of Cylindrical Alkaline Dry Battery

An AA-size alkaline dry battery (LR6) with a structure as shown in FIG. 1 was fabricated in the following procedure. FIG. 1 is a partially sectional front view of a cylindrical alkaline dry battery. A magnified longitudinal sectional view of the portion X (a sealing portion) in FIG. 1 is shown in FIG. 2.

Two pellets of positive electrode mixture 2 obtained in the foregoing manner were inserted into the battery case 1, and the pellets of positive electrode material mixture 2 were remolded with a pressing jig to be brought into close contact with the inner wall of the battery case 1. The separator 4 of a bottomed cylindrical shape was disposed in the center of the positive electrode material mixture 2 brought into close contact with the inner wall of the battery case 1. A predetermined amount of 40 wt % potassium hydroxide aqueous solution was injected into the separator 4 as an alkaline electrolyte. After the lapse of a predetermined period of time, the gelled negative electrode 3 obtained in the foregoing manner was filled into the separator 4. For the separator 4, a non-woven fabric mainly composed of polyvinyl alcohol fibers and rayon fibers was used.

A groove was formed in the vicinity of the opening of the battery case 1 to form the step 1a. The assembled sealing part 12 was placed in the opening of the battery case 1 in such a manner that the horizontal portion 14b of the assembled sealing part 12 was supported by the step 1a. At this time, part of the negative electrode current collector 6 was inserted into the gelled negative electrode 3. The assembled sealing part 12 was obtained by electrically welding the head 6a of the negative electrode current collector 6 and the flat portion 7b of the negative electrode terminal plate 7, and inserting the shank 6b of the negative electrode current collector 6 into the through-hole 13a of the central cylindrical portion 13 of the sealing member 5 made of nylon. At this time, blown asphalt ("10-20 Blown Asphalt" available from Nippon Oil Corporation) was applied as a sealant to a portion where the shank 6b was press-fit to the through-hole 13a. The applied amount was 1.0 mg/cm².

The end portion of the opening of the battery case 1 was curved such that an upper end of the upper cylindrical portion 14a of the sealing member 5 was wrapped therein, and then crimped inward such that the periphery of the negative electrode terminal plate 7 was fixed tightly by the end portion of the opening of the battery case 1 with the outer cylindrical portion 14 interposed therebetween. In such a manner, the opening of the battery case 1 was sealed. The outer surface of the battery case 1 was covered with an outer label 10.

In the forgoing fabrication of the alkaline battery, the resin sealing members 5 made of the materials as shown in Table 1 were fabricated by injection molding. At this time, the sealing members were heated with various heating times and temperatures so that the equilibrium moisture contents at a relative humidity of 50% were adjusted to the values as shown in Table 1. These sealing members were used to fabricate Alkaline Batteries No. 1 to 17.

Here, Batteries No. 4, 7 to 12 and 14 are of Examples and Batteries No. 1 to 3, 5, 6, 13 and 15 to 17 are of Comparative Examples. Further, in Examples of the present invention, the diameter A of the shank 6b of the negative electrode current collector 6 was 1.40 mm, the diameter B of the through-hole 13a of the sealing member 5 was 1.30 mm and the outer diameter C of the central cylindrical portion 13 of the sealing member 5 was 3.5 mm.

The equilibrium moisture content at a relative humidity of 50% of the sealing member 5 was determined by measuring a weight W1 of a sealing member after allowed to stand for 48 hours in an environment with a temperature of 45° C. and a relative humidity of 50%, and a weight W2 of a sealing member after allowed to stand for 24 hours in a dry environment under vacuum with a temperature of 45° C., and calculating from the equation of $(W1-W2)/W2 \times 100$.

The dimensions of the diameter B of the through-hole 13a of the sealing member 5 and the outer diameter C of the central cylindrical portion 13 of the sealing member 5 were measured under the conditions where after a sealing member was allowed to stand for 48 hours in an environment with a temperature of 45° C. and a relative humidity of 50%, an equilibrium of the moisture content in the sealing member was reached.

TABLE 1

| Bat. No. | Sealing member Material | Equilibrium moisture content at a relative humidity of 50% (%) | Number of leaked batteries (pcs) After 3-month storage | After 4-month storage |
|---|---|---|---|---|
| 1 | 6,6-nylon | 2.7 | 6 | 15 |
| 2 |  | 2.4 | 4 | 9 |
| 3 |  | 2.1 | 3 | 8 |
| 4 |  | 1.7 | 0 | 2 |
| 5 | 6,8-nylon | 2.1 | 3 | 5 |
| 6 |  | 1.9 | 1 | 3 |
| 7 |  | 1.7 | 0 | 1 |
| 8 | 6,10-nylon | 1.7 | 0 | 2 |
| 9 |  | 1.5 | 0 | 1 |
| 10 |  | 1.3 | 0 | 0 |
| 11 | 6,12-nylon | 1.3 | 0 | 0 |
| 12 |  | 1.0 | 0 | 0 |
| 13 |  | 0.8 | 1 | 1 |
| 14 | 11-nylon | 0.9 | 0 | 0 |
| 15 |  | 0.7 | 1 | 2 |
| 16 |  | 0.6 | 1 | 2 |
| 17 | 12-nylon | 0.6 | 2 | 2 |

Example 2

A manganese dioxide powder and a graphite powder were mixed in a weight ratio of 100:10. This mixture and a 40 wt % potassium hydroxide aqueous solution serving as an alkaline electrolyte were mixed in a weight ratio of 100:1, sufficiently stirred, and then compression molded into flakes. Thereafter, the flakes of positive electrode material mixture were crushed into granules, which were then classified into 10 to 100 mesh with a sieve. The resultant granules were molded under pressure into hollow cylinders, thereby to obtain pellets of positive electrode material mixture.

Thereafter, Batteries No. 18 to 23 were fabricated in the same manner as in Batteries No. 1, 5, 8, 11 14 and 17 except that the positive electrode material mixture obtained in the foregoing manner including manganese dioxide only was used as a positive electrode material mixture in place of the positive electrode material mixture of Example 1 including a mixture of manganese dioxide and nickel oxyhydroxide serving as a positive electrode material mixture. Here, in Table 2, Batteries No. 20 to 22 are of Examples and Batteries No. 18, 19 and 23 are of Comparative Examples.

TABLE 2

| | | Sealing member | | |
|---|---|---|---|---|
| | | Equilibrium moisture content at | Number of leaked batteries (pcs) | |
| Bat. No. | Material | a relative humidity of 50% (%) | After 3-month storage | After 4-month storage |
| 18 | 6,6-nylon | 2.7 | 2 | 5 |
| 19 | 6,8-nylon | 2.1 | 1 | 4 |
| 20 | 6,10-nylon | 1.7 | 0 | 2 |
| 21 | 6,12-nylon | 1.3 | 0 | 0 |
| 22 | 11-nylon | 0.9 | 0 | 0 |
| 23 | 12-nylon | 0.6 | 1 | 1 |

[EVALUATION]

In order to evaluate the leakage resistance of batteries, 20 batteries each as fabricated in the foregoing manner were prepared and stored for three months and four months in an environment with a temperature of 60° C. and a relative humidity of 90%. The number of leaked batteries after the storage was checked. The presence of leakage was judged visually.

The foregoing evaluation results are shown in Tables 1 and 2. In Batteries No. 1 to 3, 5, 6, 13, 15 to 17, 18, 19 and 23 of Comparative Examples, leakage was observed in some of the batteries after 3-month storage, but in the batteries No. 4, 7 to 12, 14 and 20 to 22 of Examples of the present invention, no leakage was observed in any of the batteries after 3-month storage. In particular, in Batteries No. 10 to 12, 14, 21 and 22 including sealing members whose equilibrium moisture contents at a relative humidity of 50% were in the range of 0.9 to 1.3%, excellent leakage resistance was obtained also after 4-month storage.

Example 3

Batteries No. 24 to 31 were fabricated in the same manner as in Battery No. 11 of Example 1 except that the diameter A of the shank of the negative electrode current collector, and the diameter B of the through-hole and the outer diameter C of the central cylindrical portion of the sealing member were changed to the values as shown in Table 3. The leakage resistance of the batteries thus fabricated was evaluated in the same manner as described above. The evaluation results are shown in Table 3 together with the results of Battery No. 11.

TABLE 3

| | Diameter A of the shank of a negative electrode current collector (mm) | Sealing member | | | | Number of leaked batteries (pcs) | |
|---|---|---|---|---|---|---|---|
| | | Diameter B of a through-hole (mm) | Diameter C of a central cylindrical portion (mm) | | | | |
| Bat. No. | | | | A/B | C/A | After 3-month storage | After 4-month storage |
| 24 | 1.40 | 1.22 | 3.5 | 1.15 | 2.5 | 0 | 2 |
| 25 | 1.40 | 1.25 | 3.5 | 1.12 | 2.5 | 0 | 0 |
| 11 | 1.40 | 1.30 | 3.5 | 1.08 | 2.5 | 0 | 0 |
| 26 | 1.40 | 1.37 | 3.5 | 1.02 | 2.5 | 0 | 0 |
| 27 | 1.40 | 1.39 | 3.5 | 1.01 | 2.5 | 0 | 3 |
| 28 | 1.40 | 1.30 | 5.0 | 1.08 | 3.6 | 0 | 2 |
| 29 | 1.40 | 1.30 | 4.5 | 1.08 | 3.2 | 0 | 0 |
| 11 | 1.40 | 1.30 | 3.5 | 1.08 | 2.5 | 0 | 0 |
| 30 | 1.40 | 1.30 | 2.5 | 1.08 | 1.8 | 0 | 0 |
| 31 | 1.40 | 1.30 | 2.0 | 1.08 | 1.4 | 0 | 1 |

In Batteries No. 11 and 24 to 31, no leakage was observed in any of the batteries after 3-month storage. In particular, in Batteries No. 11, 25, 26, 29 and 30 in which the A/B was 1.02 to 1.12 and the C/A was 1.8 to 3.2, excellent leakage resistance was obtained also after 4-month storage.

Example 4

Batteries No. 32 to 35 with the same structure as that of Battery No. 11 except that various materials as shown in Table 4 were used in place of the blown asphalt as a sealant to be applied to a portion where the shank of the negative electrode current collector was press-fit to the through-hole, or no sealant was applied were fabricated. The leakage resistance of the batteries thus fabricated was evaluated in the same manner as described above. Here, for the polybutene, "Polybutene HV-1900" available from Nippon Oil Corporation was used. For the polyaminoamide, "Tomaido" available from Fuji Kasei Kogyo Co., Ltd. was used. For the perfluoro polyethyl ether, "Krytox 104" available from E.I. Du Pont de Nemours & Co. Inc. was used.

The evaluation results are shown in Table 4 together with the results of the battery No. 11.

TABLE 4

| Bat. No. | Sealant | Number of leaked batteries after 3-month storage (pcs) |
|---|---|---|
| 32 | Nil | 19 |
| 11 | Blown asphalt | 0 |
| 33 | Polybutene | 0 |
| 34 | polyaminoamide | 0 |
| 35 | Perfluoro polyethyl ether | 0 |

In Battery No. 32 in which no sealant was applied, the leakage resistance was reduced, but in Batteries No. 11 and 33 to 35 in which a sealant was applied, no leakage was observed in any of the batteries.

INDUSTRIAL APPLICABILITY

The alkaline dry battery of the present invention has an excellent reliability and is preferably applicable as a power source for electronic equipment or portable devices, and the like.

The invention claimed is:

1. An alkaline battery comprising:

a battery case;

a power generating element housed in an interior of said battery, an assembled sealing part for closing an opening of said battery case; and an alkaline electrolyte included in said power generating element, said power generating element comprising a positive electrode material mixture brought into close contact with the inner wall of said battery case, a gelled negative electrode disposed in a hollow of said positive electrode material mixture, and a separator disposed between said positive electrode material mixture and said gelled negative electrode, said assembled sealing part including a negative electrode terminal plate, a negative electrode current collector having a head for providing an electrical connection with said negative electrode terminal plate and a shank, and a resin sealing member, said sealing member including a central cylindrical portion having a through-hole for inserting the shank of said negative electrode current collector therethrough, a peripheral cylindrical portion interposed between a periphery of said negative electrode terminal plate and an end portion of the opening of said battery case, and a joint portion for joining said central cylindrical portion and said peripheral cylindrical portion, the shank of said negative electrode current collector being inserted in the center of said gelled negative electrode, the end portion of the opening of said battery case being curved such that an upper portion of the peripheral cylindrical portion of said sealing member is wrapped therein, and the curved portion of said battery case being crimped inward such that the periphery of said negative electrode terminal plate is fixed tightly, wherein said sealing member includes polyamide having an equilibrium moisture content at a relative humidity of 50% of 0.9 to 1.7%, the lower face of said central cylindrical portion of said sealing member is in contact with said gelled negative electrode, and in said assembled sealing part before assembling, a diameter A of the shank of said negative electrode current collector, and a diameter B of said through-hole and an outer diameter C of said central cylindrical portion at a relative humidity of 50% satisfy A/B=1.02 to 1.12 and C/A=1.8 to 3.2.

2. The alkaline battery in accordance with claim 1, wherein said polyamide includes 6, 10-nylon or 6, 12-nylon.

3. The alkaline battery in accordance with claim 1, wherein said positive electrode material mixture includes a nickel oxyhydroxide.

4. The alkaline battery in accordance with claim 1, wherein between the shank of said negative electrode current collector and the through-hole of said central cylindrical portion, asphalt, polybutene or polyaminoamide is applied as a sealant.

5. The alkaline battery in accordance with claim 1, wherein said polyamide comprises 6, 12-nylon, and between the shank of said negative electrode current collector and the through-hole of said central cylindrical portion, blown asphalt is applied as a sealant.

6. The alkaline battery in accordance with claim 1, wherein said sealing member includes polyamide having an equilibrium moisture content at a relative humidity of 50% of 0.9 to 1.3%.

* * * * *